Nov. 15, 1932.    C. J. BARROW    1,887,974

METHOD OF CUTTING GLASS

Filed April 16, 1928

Inventor
Charles J. Barrow
by John F. Bartlett
His Attorney.

Patented Nov. 15, 1932

1,887,974

UNITED STATES PATENT OFFICE

CHARLES J. BARROW, OF ALBANY, NEW YORK

METHOD OF CUTTING GLASS

Application filed April 16, 1928. Serial No. 270,509.

The present invention relates to cutting of glass and more especially the kinds of glass that do not sever readily, such as reinforced or safety glass comprising plates of glass united adhesively to an interposed sheet or sheets of non-shatterable material, such as celluloid.

On account of the resistance to fracture characteristic of the reinforcement material much difficulty has been experienced heretofore in cutting or shaping safety glass to desired patterns since fracture of the glass does not expose the reinforcement for operation thereon of cutting tools even when the fracture is rectilinear.

The object of my invention is the provision of an improved method of glass cutting whereby safety glass may be cut or severed quickly and accurately along desired lines.

Figure 1:
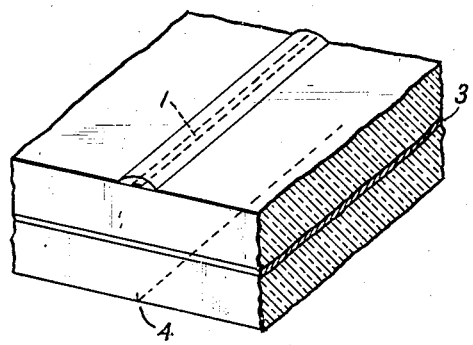
Figure 2:
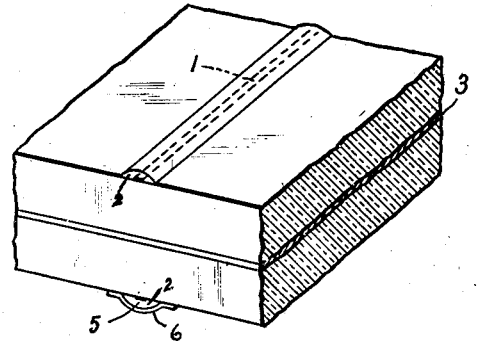
Figure 3:
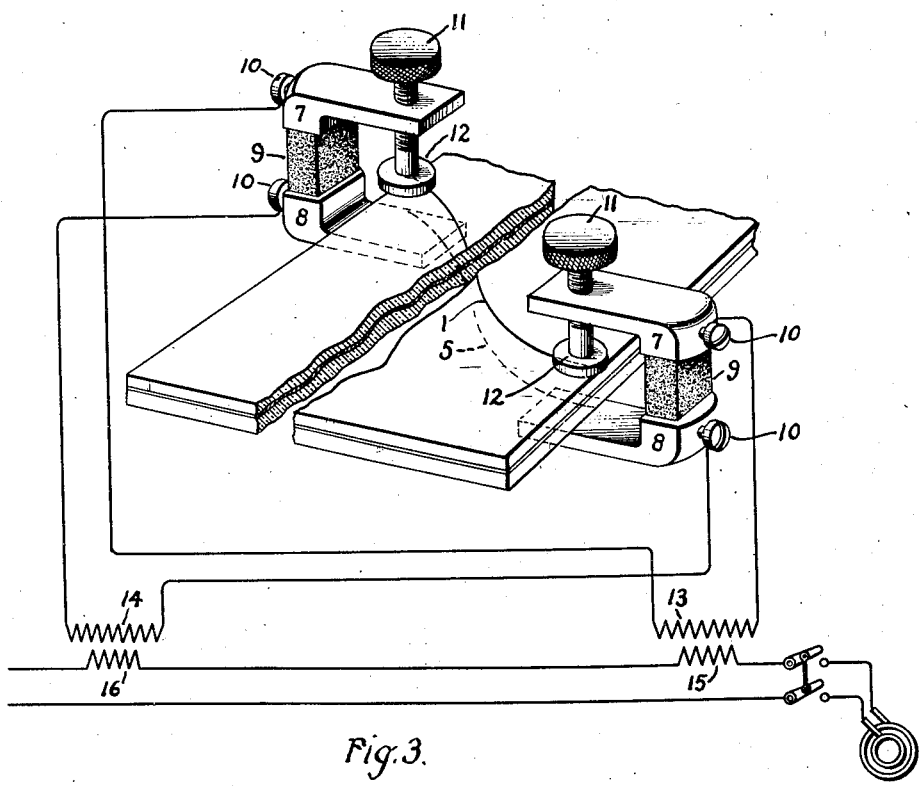

The manner of carrying out my invention is shown diagrammatically in the accompanying drawing, in which Fig. 1 is a perspective view of a section of safety glass plate with a single electrically conductive path thereon; Fig. 2 is a similar view with conductive paths disposed on both sides of the glass plate, and Fig. 3 is a perspective view of a segment of glass plate with the electric connections and power circuit connected.

In carrying out my invention, a high resistance path for electric current, such as a narrow stripe 1 of carbon loaded paint or lacquer, is applied to the surface of the glass along the line of desired severance, and in order to confine its heating power to the glass and to retard its oxidation, it may be covered with a suitable material 2, such as powdered lime, fly ash, etc.

Upon passage of electric current through the resistance path 1, the glass with which it is in immediate contact very quickly becomes heated and in consequence electrically conductive so that the current transfers to the heated glass path. The heat developed by the passage of the current operates partially to fuse and to crack the glass and also concurrently or shortly thereafter to melt or weaken the reinforcement 3 so that it readily gives way upon the application of slight stress to the cracked glass. In some kinds of glass actual fusion is not necessary.

As shown in Fig. 1, the resistance path 1 is applied only to the upper sheet of glass and in order to insure breakage of the lower sheet along a true line, it is scored at 4 directly opposite the resistance path 1.

As shown in Fig. 2, a high resistance path 5 is applied to the lower glass sheet as well as to the upper, and to retain the heat insulating material 2 in place thereon a sticker tape 6 or other article may be applied over it prior to inversion of the plate or the plate may be inverted and deposited on a bed of heat insulating material. This double path arrangement insures accurate and simultaneous cracking from both sides of a plate however thick and in the case of safety glass the simultaneous cracking of both sheets and fusion or weakening of the reinforcement 3 upon a very short application of the electric current.

I prefer a relatively fine or attenuated resistance path for the electric current since it much more accurately defines the line of fusion and breakage of the glass by concentrating and minimizing the heat, and less electric current is required. The potential of the current is relatively high ranging up to ten thousand volts per foot of resistance path. However, a relatively heavy resistance path dispenses with the use of the heat confining powder, since it does not become consumed or oxidized in the open air prior to the raising of the temperature of the adjacent glass to its electrically conductive condition.

The manner of applying the electric current, as shown in Fig. 3, consists in fixing pairs of contact plates 7 and 8 to opposite ends of the resistance paths 1 and 5 and connecting them in circuit. The plates 7 and 8 of each pair are connected by an insulating post 9 and their outer ends are provided with binding screws 10. The upper contact has therein a thumb screw 11 with a swiveled disk contact 12 at its free end so that upon positioning the contact plates and turning down upon the thumb screws 11 they will make intimate contact with the respective resistance paths 1 and 5.

On account of the electrical resistance of a conductor of the second class, to which glass belongs, decreasing with increase of temperature, there is a tendency for the current to favor the resistance path that starts first to heat the glass. The effect is cumulative and, unless prevented, will shunt the current from the other path. To prevent such shunting of the current, I connect the secondaries 13 and 14 of two potential transformers 15 and 16 to the upper and lower contact plates 7 and 8 respectively, with polarity as indicated. The primaries of these transformers are connected in series and supplied from a single source of power. By reason of the inherent characteristic of this arrangement potential shifts from the path of low to the path of high resistance thereby tending to maintain the currents in the two paths approximately equal. The polarity of the secondary connections is such that the tendency for current to pass from one path to the other is a minimum. Other means may be adapted for insuring equal or balanced currents in the two paths simultaneously.

In the cases where the glass plate is to be severed along substantially straight lines, it may be scored and cracked, flexed to open the crack at one side and the resistance paint or lacquer introduced therein in contact with or close juxtaposition to the reinforcement sheet 3. Upon applying electric current to the resistance path thus formed, the reinforcement sheet is quickly heated and weakened to permit its ready severance without fusion of the glass taking place.

While I have shown and described the best method and means known to me for carrying out my invention, I do not desire to be restricted thereto.

What I claim as new and desire to secure by Letters Patent of the United States is,—

1. The method of severing reinforced glass consisting of applying a resistance path to the surface of the glass along the desired line of severance, and passing electric current through said resistance path until both the glass and reinforcement are weakened sufficiently to give way under slight stress.

2. The method of severing reinforced glass consisting in applying a resistance path to the surface of the glass along the desired line of severance, protecting said resistance path against oxidation and heat radiation, and passing electric current through said path until both the glass and the reinforcement are weakened sufficiently to give way under slight stress.

3. The method of severing reinforced glass consisting of applying resistance paths to opposite surfaces of the glass along the desired line of severance and applying electric current to said resistance paths until the glass and reinforcement are sufficiently weakened to give way under slight stress.

4. The method of severing reinforced glass consisting of applying resistance paths to opposite surfaces of the glass along the line of desired severance, protecting said paths against oxidation and heat radiation and applying electric current to said resistance paths until the glass and reinforcement are weakened sufficiently to give way under slight stress.

5. The method of severing glass consisting of applying resistance paths to opposite surfaces of the glass along the desired line of severance, applying simultaneously electric currents to said paths, and controlling the flow of current in the respective paths to maintain a balance of the heating effects produced thereby.

6. The process of cutting laminated glass having a plurality of layers between which shatter preventing and binding material is interposed, which comprises cracking the glass layers along the predetermined line of separation, the binding material at said line being separated by the application of an electrically heated conductor applied at said line for quickly and locally heating the glass and binding material at said line to soften the latter along said line only to a degree readily permitting the separation, while leaving the binding material intact at points substantially spaced from said line.

7. Process of cutting laminated glass having a plurality of layers of glass between which shatter preventing and binding material is interposed, which comprises cracking the glass along a desired line of separation, and then applying an intense localized heat at said line by the use of electrically heated conducting means to quickly and substantially uniformly soften the binding material at said line within a narrow zone only, to permit separation along the desired line without disturbance of the binding material remote from said line, and then discontinuing the heating and promptly separating the glass at said line before the heat within said zone has substantially radiated to the adjacent glass and before the binding material has substantially hardened.

8. Process of severing laminated glass of which the laminations are secured together by shatter preventing material, which comprises cracking the laminations of the glass along the desired line of severing, and then separating the shatter preventing material at said line by the controlled application of a high temperature at said line for quickly heating the glass and binding material at said line to soften the latter locally while leaving the binding material intact at points substantially spaced from said line.

9. Process of severing laminated glass of which the laminations are secured together by shatter preventing binding material, which comprises cracking the glass layers along a predetermined line of separation, the binding material at said line being separated by the controlled application of heat along said line only, sufficient to soften only a narrow strip of the binding material at said line.

10. In the art of sectionally separating a glass structure having shatter-preventing and binding material interposed between glass laminations fractured along a predetermined line extending from edge to edge thereof, the steps which consist in applying an elongated heat transmitting structure directly to at least one of said laminations throughout the entire length of said line thereby heating the glass and said material at said line and only immediately adjacent thereto, and immediately applying force to said glass structure whereby said material is separated at said line without substantial disturbance thereof between said laminations.

In witness whereof, I have hereunto set my hand this 2nd day of April, 1928.

CHARLES J. BARROW.